(12) United States Patent
Dogarescu et al.

(10) Patent No.: US 9,045,159 B2
(45) Date of Patent: Jun. 2, 2015

(54) VIBRATION-DAMPING INFLATOR AND AIRBAG MODULE FOR A VEHICLE INCLUDING SAID INFLATOR

(71) Applicant: TRW Airbag Systems GmbH, Aschau am Inn (DE)

(72) Inventors: Alin-Silviu Dogarescu, Oberflossing (DE); Franz Furstenberger, Taufkirchen (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 0 days.

(21) Appl. No.: 14/316,951

(22) Filed: Jun. 27, 2014

(65) Prior Publication Data

US 2015/0021888 A1      Jan. 22, 2015

(51) Int. Cl.
  *B62D 7/22*        (2006.01)
  *B60R 21/203*      (2006.01)
  *B60R 21/20*       (2011.01)
  *B60R 21/264*      (2006.01)
  *B60R 21/26*       (2011.01)
  *F16F 7/10*        (2006.01)

(52) U.S. Cl.
  CPC ............. *B62D 7/222* (2013.01); *B60R 21/203* (2013.01); *B60R 21/20* (2013.01); *B60R 21/264* (2013.01); *B60R 2021/26011* (2013.01); *B60R 2021/26076* (2013.01); *B60R 21/2644* (2013.01); *F16F 7/10* (2013.01)

(58) Field of Classification Search
  CPC .... B60R 21/20; B60R 21/203; B60R 21/2644
  USPC .................................. 280/731, 741
  See application file for complete search history.

(56) References Cited

U.S. PATENT DOCUMENTS 8,286,766 B2 * 10/2012 Terada et al. ............. 188/379
8,567,818 B2 * 10/2013 Umemura et al. ......... 280/731

FOREIGN PATENT DOCUMENTS

DE      10110912       9/2002
DE      102008049652   4/2010
DE      102011017350   10/2012

* cited by examiner

*Primary Examiner* — Faye M Fleming
(74) *Attorney, Agent, or Firm* — Tarolli, Sundheim, Covell & Tummino LLP

(57) ABSTRACT

An inflator (10) for a vehicle airbag module comprises an external housing (12) in which a combustion chamber (36) is formed, wherein the inflator (10) can be supported to be oscillating on a body-side component of the vehicle, especially on a component of the airbag module. Inside the external housing (12) a separate balancing weight (58) is arranged for adjusting the vibration behavior of the inflator (10), wherein the balancing weight (58) has no further inflator-specific function. In an airbag module for a vehicle including such inflator (10) the latter is supported by its retaining means on another component of the airbag module so that it is adapted to oscillate about a suspension plane.

25 Claims, 2 Drawing Sheets though, the application involves smaller inflators carrying the risk of shifting of the center of mass upward. The invention is directed to providing a larger damper mass without increasing the overall size of the inflator, in particular the axial dimension thereof.

VIBRATION-DAMPING INFLATOR AND AIRBAG MODULE FOR A VEHICLE INCLUDING SAID INFLATOR

BACKGROUND OF THE INVENTION

The invention relates to an inflator for a vehicle airbag module comprising an external housing in which a combustion chamber is formed, wherein the inflator is supported to be oscillating on a body-side component of the vehicle, especially on a component of the airbag module. The invention further relates to an airbag module for a vehicle including said inflator.

In a vehicle the driver perceives vibrations of the steering wheel as disturbing. Such vibrations can have various reasons, but in most cases they are transmitted via the steering column to the steering wheel. For damping steering wheel vibrations spring-mass systems, also referred to as mass dampers, are used in manifold configurations. Systems in which the inflator of an airbag module arranged in the steering wheel is employed as counter-oscillating damper mass are of particular importance.

It has to be taken into account, however, that in particular up-to-date driver airbag modules require ever smaller inflators. If, however, the mass of the inflator is too small, it cannot or can only be employed to a limited extent as mass damper.

In DE 10 2011 017 350 A1 a device for damping vibrations of a steering column is shown comprising a holder and a receiving means resiliently supported in the holder to which an inflator is secured. In order to increase the oscillating mass a separate additional weight adapted to be secured outside the inflator and/or at the receiving means is provided below the inflator.

A drawback of known mass dampers frequently is a vibrating behavior that is not optimal which can especially be due to an unfavorable position of the center of mass of the damper mass relative to the suspension thereof.

SUMMARY OF THE INVENTION

It is the object of the invention to improve suppression of steering wheel vibrations in a vehicle with the aid of an oscillating inflator.

This object is achieved by an inflator comprising the features of claim 1 as well as by an airbag module comprising the features of claim 12. Advantageous and expedient configurations of the inflator according to the invention and of the airbag module according to the invention are stated in the corresponding subclaims.

The inflator for a vehicle airbag module according to the invention comprises an external housing in which a combustion chamber is formed, wherein the inflator can be supported to be oscillating on a body-side component of the vehicle, especially on a component of the airbag module. In accordance with the invention, inside the external housing a separate balancing weight is arranged for adjusting the vibrating behavior of the inflator, wherein the compensating weight has no further inflator-specific function. In this case "inflator-specific function" means cooperation and/or contribution regarding the provision of a low-pollutant pre-defined and pre-heated fluid (gas volume) for inflating an airbag. Thus, apart from its function as balancing weight regarding vibration damping, the balancing weight has no further typical function, as it is shown by conventional inflator components, for example a filter, an electric igniter, a propellant or the like, or a part thereof.

SUMMARY OF THE INVENTION

The invention is initially based on the finding that the arrangement of an additional weight chosen inside the inflator for increasing the mass of an oscillating inflator can be easily managed and is possible even without any specific fasteners, as the balancing weight cannot fall out of the external housing of the inflator. As regards the mass and the shape, the balancing weight can be adapted to the respective vibration requirements and to the concrete mounting situation.

According to the preferred embodiment of the invention, the balancing weight is arranged in the combustion chamber of the inflator. As a rule, the combustion chamber offers sufficient space or it can be dimensioned such that the balancing weight can be accommodated therein. The material of the balancing weight should be selected so that preferably it does not hinder burn-out of the propellant in the combustion chamber. In this case materials having relatively high density are preferred such as e.g. various types of steel, for example "carbon steel". But also other materials such as copper, brass, tungsten are taken into consideration.

Most easily the balancing weight can be integrated in the inflator by placing it in such way that it rests on a bottom portion of the external housing. With the propellant and possible further components of the inflator in turn resting on the balancing weight a defined axial position of the balancing weight in the external housing is resulting. The positioning of the balancing weight on the bottom portion moreover offers the advantage that the center of mass of the inflator can be displaced specifically downwards, i.e. in the direction of the igniting unit of the inflator.

Undesired slipping of the balancing weight in the external housing can be efficiently prevented by a peripheral rim of the balancing weight extending on the outside substantially in parallel to and in direct vicinity of an inner wall of the external housing. Such configuration largely prevents the balancing weight from reciprocating in the radial direction.

On the rim of the balancing weight a filter of the inflator may rest for separating the combustion chamber from discharge orifices formed in the external housing. in this case the balancing weight advantageously provides for a defined axial positioning of the filter and/or the two components mutually fix their axial position.

So that the inflators for a driver airbag module may continue to be built in the proven configuration including a centrally arranged igniting unit the balancing weight must not "get in the way of" the igniting unit. This can be achieved in that the balancing weight includes an opening for the passage of the igniting unit.

The balancing weight arranged inside the external housing has a mass preferably corresponding to approx. 20 to 60%, especially 25 to 53% of the total weight of the inflator.

The density of the inflator including the balancing weight preferably amounts to approximately 3.5 to 4.2 g/cm³, especially 3.6 to 4.1 g/cm³, which is definitely more than the density of a comparable inflator without an integrated balancing weight. That is to say, the inflator according to the invention provides a larger damper mass while having the same size.

The ratio of the density of the inflator to the releasable amount of gas of the inflator preferably amounts to approx. 2.3 to 4.7 g*m⁻³*mol⁻¹, especially 2.4 to 4.6 g*cm⁻³*mol⁻¹.

The ratio of the mass of the balancing weight to the releasable amount of gas of the inflator preferably amounts to approx. 50 to 190 g/mole, especially 54 to 180 g/mol.

It has turned out that with a predetermined external housing a ratio of the mass of all parts of the inflator disposed inside the external housing to the mass of the balancing weight of approx. 0.6 to 1.8, especially 0.7 to 1.7, is of advantage.

The invention also provides an airbag module for a vehicle including an inflator as described above. The inflator is supported by a retaining means, especially a flange, on another component of the airbag module so that it can oscillate about a suspension plane.

The inflator is thus disconnected from the vehicle body and serves as damper mass for damping the vibrations of the steering wheel. Concerning the advantages of this mass damper system the corresponding foregoing remarks on the inflator according to the invention can be referred to.

The vibrating behavior of the inflator turns out to be optimal when it oscillates about its center of mass. In the airbag module according to the invention, this can be obtained by designing the mass and the position of the balancing weight inside the external housing so that the center of mass of the inflator is approximately located in the suspension plane.

Of preference, the total weight of those components or component portions of the inflator arranged above the suspension plane substantially corresponds to the total weight of those components or component portions of the inflator arranged below the suspension plane. Such weight distribution regarding the suspension plane results in a pre-definable desired vibration behavior of the inflator.

When designing the airbag module according to the invention, the objective should be that the ratio of the total weight of the inflator above the suspension plane to the total weight below the suspension plane amounts to 1±0.25, preferably 1±0.1.

BRIEF DESCRIPTION OF THE DRAWINGS

Further features and advantages of the invention are resulting from the following description and from the enclosed figures which are referred to and which show in.

DESCRIPTION OF EMBODIMENTS

Figure 1:
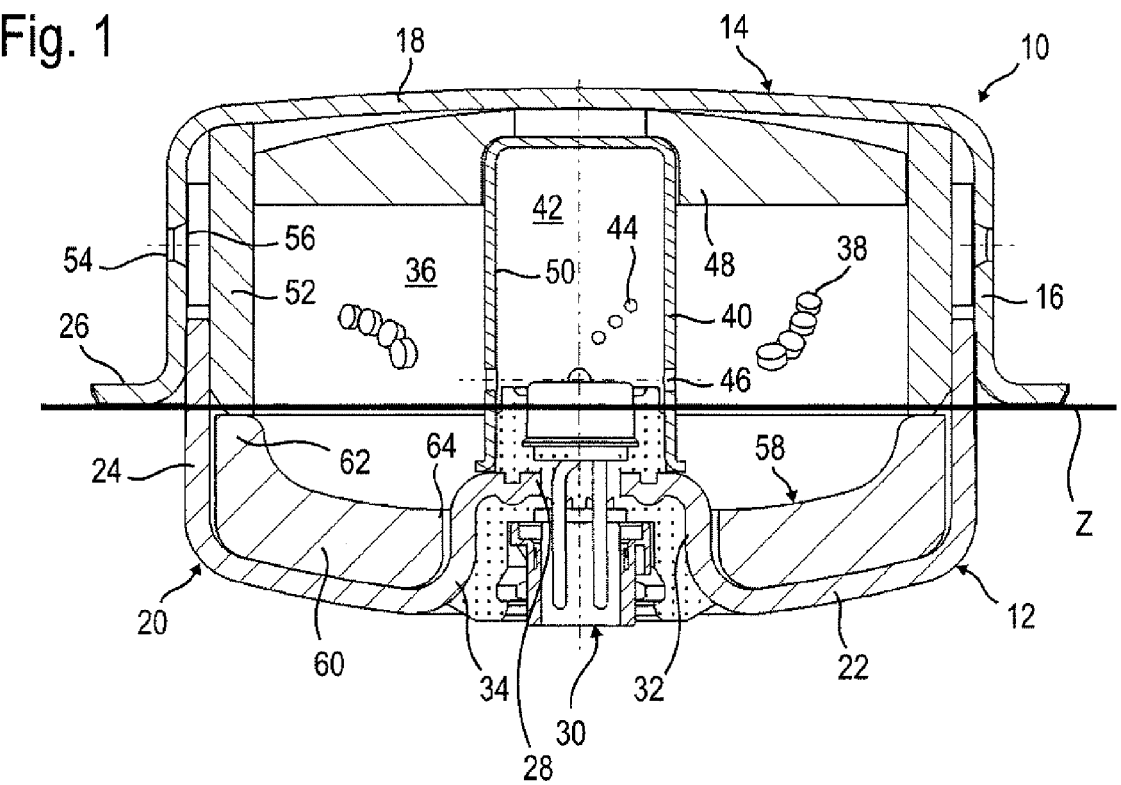
FIG. 1 a sectional view of an inflator according to the invention.

FIG. 1 illustrates an inflator 10 for a steering wheel airbag module the basic structure of which is known from DE 10 2008 049 652 A1. The inflator 10 includes an external housing 12 composed of a cup-shaped diffusor 14 and a locking member 20.

The diffusor 14 includes a circumferential peripheral wall 16 and a ceiling portion 18. At the locking member-side end the peripheral wall 16 of the diffusor 14 is bent outwardly so that a planar flange 26 which is horizontally circumferential about the inflator 10 is formed.

The locking member 20 which at the same time constitutes the bottom of the inflator 10 includes a bottom portion 22 and a circumferential elevated rim 24. The rim 24 is adjacent to the inside of the peripheral wall 16 of the diffusor 14 and thus forms a wall of the external housing 12 projecting further inwardly as compared to the peripheral wall 16. In a central opening 28 of the locking member 20 an igniting unit 30 is accommodated. The locking member 20 includes an indentation 34 having an annular portion 32 toward the central opening 28.

The elements described hereinafter that are located inside the external housing 12 are shown separately in FIG. 2, i.e. without the external housing 12.

Inside the external housing 12 first an annular, hence substantially toroidal combustion chamber 36 is formed which is filled with a known pyrotechnic gas-generating propellant 38, indicated here by several tablets.

Toward the central axis of the inflator 10 the combustion chamber 36 is delimited by a cap 40 enclosing the igniting unit 30 and an ignition chamber 42. The ignition chamber 42 is filled with a booster charge 44 of pyrotechnic gas-generating material, equally only indicated in this case. The cap 40 is lined on the inside with a sleeve 50 that, prior to activation of the inflator 10, closes the overflow orifices 46 formed in the cap 40. Upon ignition of the igniting unit 30 the sleeve 50 is ruptured at least in the area of the overflow orifices 46 so that hot gas or particles can flow from the ignition chamber 42 into the combustion chamber 36 so as to ignite the propellant 38.

Figure 2:
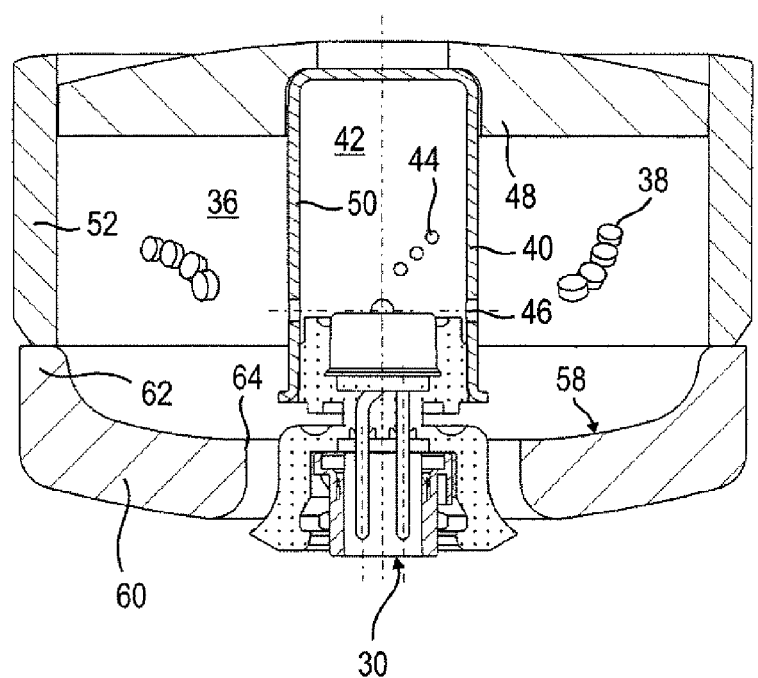
FIG. 2 a sectional view of the inner parts of the inflator.

In the upper area of the combustion chamber 36 as shown in FIGS. 1 and 2 an elastic filling material 48 is arranged which is adjacent to the ceiling portion 18 of the diffusor 14 and serves especially as volume balance for different fill levels of the propellant 38. The filling material 48 can be formed of knitted fabric made of wire or of silicone and can be compressed when the cap 40 moves due to pressure increase in its interior. Irrespective thereof, the filling material 48 can keep the propellant 38 in a defined position until it is activated in the case of release of the inflator, the position being predetermined by the filling operation of propellant 38 into the combustion chamber 36.

Moreover, in the combustion chamber 36 a filter 52 is arranged which in this case has an annular, substantially cylindrical shape and extends in parallel to the peripheral wall 16 of the diffusor 14 at a particular radial distance therefrom. The filter 52 can be formed of wire mesh/fabric or knitted wire fabric of differently thick wires and is pressed into the external housing 12 under axial pretension. The filter 52 does not extend over the entire height of the inflator 10, but in the shown embodiment reaches from the ceiling portion 18 of the diffusor approximately to the flange 26 only.

In the circumferential wall 16 of the diffusor 14 plural discharge orifices 54 are formed which are evenly distributed over the periphery of the diffusor 14 and are arranged at a particular axial height. The filter 52 separates the discharge orifices 54 from the combustion chamber 36. Prior to activating the inflator 10 the discharge orifices 54 are closed by a plugging 56 in the form of a film. The plugging 56 is disposed circumferentially on the inside of the peripheral wall 16 of the diffusor 14 at the height of the discharge orifices 54 and covers all discharge orifices 54.

Finally, in the interior of the external housing 12 of the inflator 10 a balancing weight 58 is further arranged whose mass and shape are adjusted to the mass and the geometry of the other inflator components, as will be explained in detail hereinafter.

Figure 3:
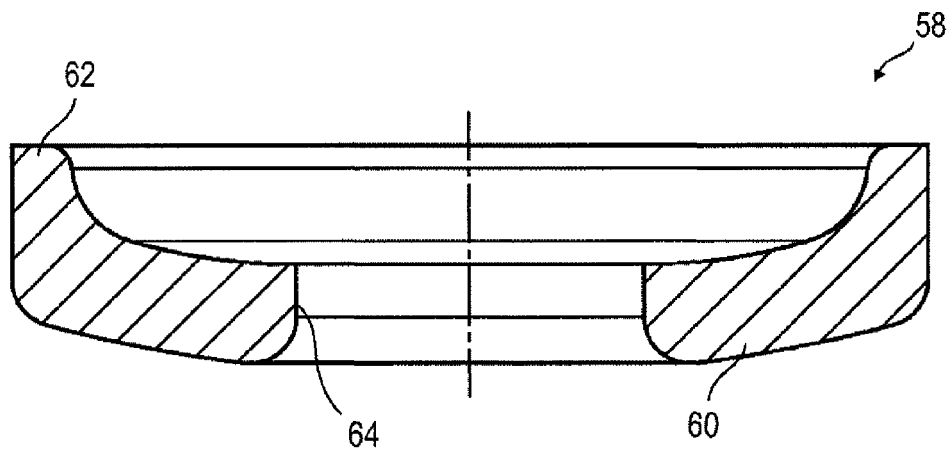
FIG. 3 a sectional view of a balancing weight of the inflator.
Figure 4:
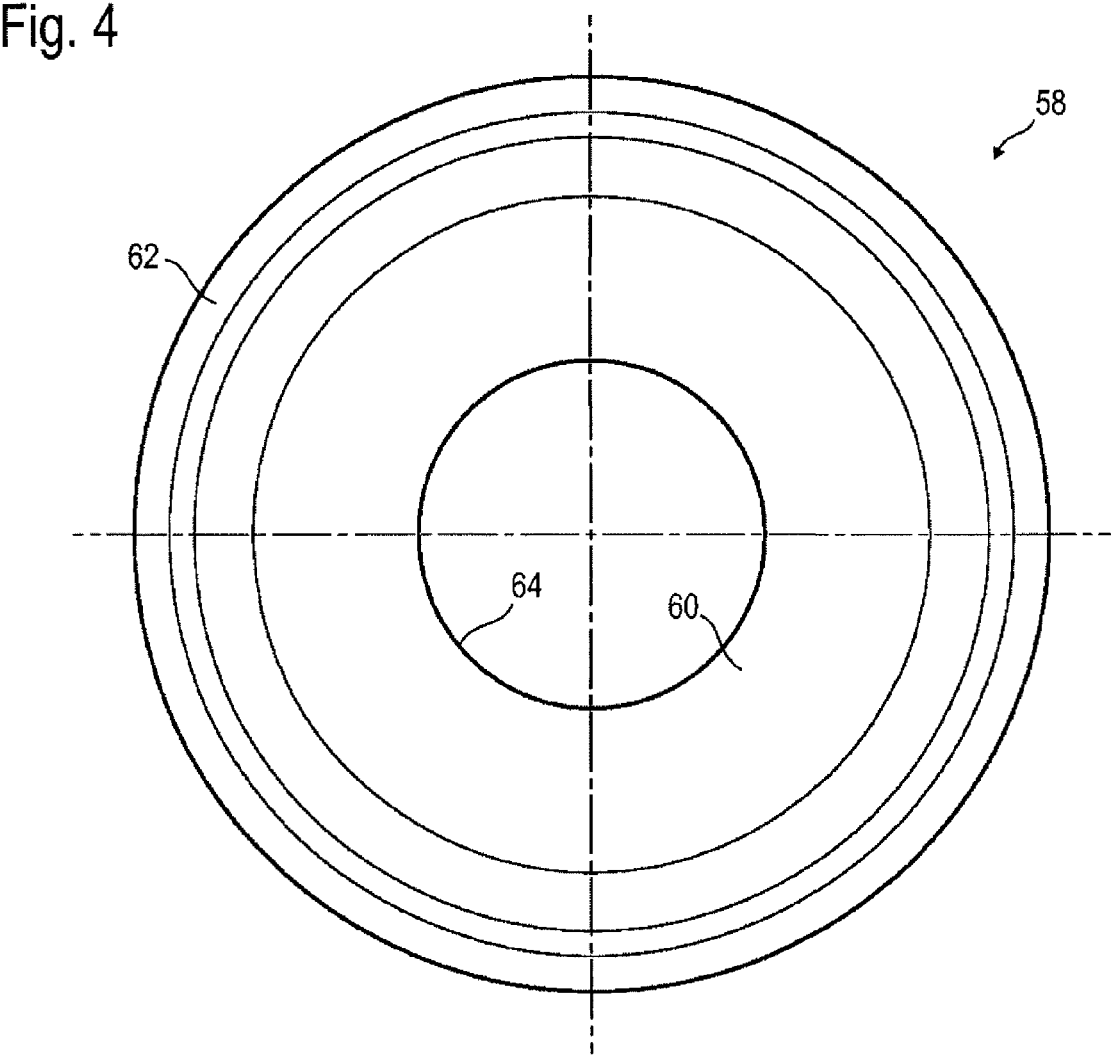
FIG. 4 a top view of the balancing weight.

The balancing weight 58, which is separately illustrated in FIGS. 3 and 4, basically has the shape of a ring including a bottom portion 60 and an elevated rim 62. In the bottom portion 60 a central opening 64 is formed.

As is evident from FIG. 1, the balancing weight 58 rests on the bottom portion 22 of the locking member 20. The central opening 64 allows for the passage of the igniting unit 30 and the indentation 34 including the annular portion 32 of the locking member 20. The circumferential rim 62 of the balancing weight 58 extends on the outside substantially in parallel to and at a small distance from, i.e. in direct vicinity of, the rim 24 of the locking member 20. The filter 52 bears on the rim 62 of the balancing weight 58.

The material of the balancing weight 58 is selected so that it does not affect the burning operations occurring in the combustion chamber 36 of the inflator 10 upon activation thereof.

The entire inflator 10 including the balancing weight 58 arranged inside the external housing 12 also serves, apart from its actual function—the provision of gas for inflating an airbag—, as mass damper for damping vibrations transmitted via the steering column or other vehicle parts to the steering wheel. Therefore, the inflator 10 is supported to be "floating", i.e. it is disconnected from the steering column to which all other steering wheel and airbag module components are (directly or indirectly) rigidly connected (possibly except for the cover cap of the airbag module).

For this purpose, the inflator 10 is suspended to be oscillating at its flange 26 by means of elastomeric elements or the like (not shown), either on a component of the airbag module or directly on the steering wheel. It is also imaginable that the inflator includes no flange directly formed integrally with its external housing, i.e. is a "flange-less" inflator considered per se, and during a separate manufacturing step a separate flange component is disposed on the external housing of the inflator. The line Z inserted in FIG. 1 marks the suspension plane of the inflator 10 in the idle condition, i.e. when no oscillations/vibrations to be damped of the vehicle are provided. The inflator 10 can oscillate perpendicularly to this plane in both directions, i.e. the suspension plane corresponds to the zero crossing of the inflator 10 when it is oscillating.

The balancing weight 58 imparts to the inflator 10 a total weight predetermined with consideration of the particular vehicle and the concrete mounting situation which causes optimum damping of the steering wheel vibrations. For identical inflators 10 including a different amount of propellant it is applicable that with a smaller amount of propellant a heavier balancing weight 58 is required than with a larger amount of propellant. Depending on the amount of propellant contained, the balancing weight 58 accounts for approx. 20 to 60%, especially 25 to 53% of the total weight of the inflator 10.

Vis-à-vis comparable conventional inflators whose density (mass/volume of the total inflator) is approximately within the range of from 2.8 to 3.4 g/cm$^3$, the balancing weight 58 increases the density of the inflator 10 described here to about a range of from 3.5 to 4.2 g/cm$^3$, especially 3.6 to 4.1 g/cm$^3$, which is substantially dependent on the amount of propellant contained and the resulting mass of the balancing weight 58. This means that, in the case of equal volume, the inflator 10 provides more damping mass. This is of advantage with inflators that are intended to be especially small due to the space requirements but are nevertheless intended to have a particular minimum mass as regards the function of mass damper.

The ratio of the density of the inflator 10 to the amount of gas released with complete burn-out of the propellant 38 ranges, depending on the amount of propellant used, approximately from 2.3 to 4.7 g$*$cm$^{-3}*$mol$^{-1}$, especially from 2.4 to 4.6 g$*$cm$^{-3}*$mol$^{-1}$. This corresponds to a ratio of the mass of the balancing weight 58 (selected as a function of the amount of propellant used) to the amount of gas released of about 50 to 190 g/mole, especially 54 to 180 g/mol.

The ratio of the mass of all parts of the inflator 10 shown in FIG. 2 and arranged inside the external housing 12 to the mass of the balancing weight 58 (selected as a function of the amount of propellant used) ranges approximately from 0.6 to 1.8, especially from 0.7 to 1.7.

For optimum vibration behavior of the inflator 10 the mass of the balancing weight 58 is selected so that the suspension plane extends approximately through the center of mass of the inflator 10. This means that the total weight of the components above the suspension plane substantially corresponds to the total weight of the lower components. In this case, the components of the inflator 10 through which the suspension plane extends, e.g. the locking member 20 including the igniting unit 30 and the propellant 38, contribute both to the "upper total weight" and to the "lower total weight". The respective contribution corresponds to the actual mass percentage of the component which is provided above and below the suspension plane. In practice, a ratio of the upper total weight to the lower total weight of the inflator of 1±0.25, preferably 1±0.1, is desired.

Depending on the concrete embodiment of the inflator 10, the balancing weight 58 can take such volume that only little or no propellant 38 at all is provided below the suspension plane. Also the axial height of the filter 52 resting on the balancing weight 58 may vary.

LIST OF REFERENCE NUMERALS 10 inflator
12 external housing
14 diffusor
16 peripheral wall
18 ceiling portion of the diffusor
20 locking member
22 bottom portion of the locking member
24 rim of the locking member
26 flange
28 opening of the locking member
30 igniting unit
32 annular portion of the locking member
34 indentation
36 combustion chamber
38 propellant
40 cap
42 ignition chamber
44 booster charge
46 overflow orifices
48 filling material
50 sleeve
52 filter
54 discharge orifices
56 plugging
58 balancing weight
60 bottom portion of the balancing weight
62 rim of the balancing weight
64 opening of the balancing weight
Z suspension plane of the inflator in the idle condition

The invention claimed is:

1. An inflator (10) for a vehicle airbag module comprising:
an external housing (12) in which a combustion chamber (36) is formed, wherein the inflator (10) can be supported to be oscillating on a body-side component of the airbag module, and
a separate balancing weight (58) enclosed entirely by the external housing (12) and arranged for adjusting the vibration behavior of the inflator (10), wherein the balancing weight (58) has no further inflator-specific function.

2. An inflator (10) for a vehicle airbag module comprising:
an external housing (12) in which a combustion chamber (36) is formed, wherein the inflator (10) can be supported to be oscillating on a body-side component of the airbag module,
wherein a separate balancing weight (58) is arranged in the combustion chamber (36) inside the external housing (12) for adjusting the vibration behavior of the inflator (10), wherein the balancing weight (58) has no further inflator-specific function.

3. The inflator (10) according to claim 1, wherein the balancing weight (58) rests on a bottom portion (22) of the external housing (12).

4. The inflator (10) according to claim 1, wherein a circumferential rim (62) of the balancing weight (58) extends on the outside substantially in parallel to and in direct vicinity of an inner wall (24) of the external housing (12).

5. An inflator (10) for a vehicle airbag module comprising:
an external housing (12) in which a combustion chamber (36) is formed, wherein the inflator (10) can be supported to be oscillating on a body-side component of the airbag module;
a separate balancing weight (58) arranged inside the external housing (12) for adjusting the vibration behavior of the inflator (10), a circumferential rim (62) of the balancing weight (58) extending on the outside substantially in parallel to and in direct vicinity of an inner wall (24) of the external housing (12), wherein the balancing weight (58) has no further inflator-specific function; and
a filter (52) separating the combustion chamber (36) from discharge orifices (54) formed in the external housing (12) that rests on the rim (62) of the balancing weight (58).

6. The inflator (10) according to claim 1, wherein the balancing weight (58) has an opening (64) for the passage of an igniting unit (30).

7. The inflator (10) according to claim 1, wherein the balancing weight (58) arranged inside the external housing (12) has a mass corresponding to about 20 to 60% of the total weight of the inflator (10).

8. The inflator (10) according to claim 1, wherein the density of the inflator (10) amounts to about 3.5 to 4.2 $g/cm^3$.

9. The inflator (10) according to claim 1, wherein the ratio of the density of the inflator (10) to the releasable amount of gas of the inflator (10) amounts to about 2.3 to 4.7 $g*cm^{-3}*mol^{-1}$.

10. The inflator (10) according to claim 1, wherein the ratio of the mass of the balancing weight (58) to the releasable amount of gas of the inflator (10) amounts to about 50 to 190 g/mole.

11. The inflator (10) according to claim 1, wherein the ratio of the mass of all parts of the inflator (10) disposed inside the external housing (12) to the mass of the balancing weight (58) amounts to about 0.6 to 1.8.

12. An airbag module for a vehicle comprising an inflator (10) according to claim 1, wherein the inflator (10) is supported by a a flange (26) on another component of the airbag module so that it can oscillate about a suspension plane (Z).

13. The airbag module according to claim 12, wherein the mass and the position of the balancing weight (58) inside the external housing (12) are configured so that the center of mass of the inflator (10) is located approximately in the suspension plane (Z).

14. The airbag module according to claim 12, wherein the total weight of the portions of the inflator (10) arranged above the suspension plane (Z) substantially corresponds to the total weight of the portions of the inflator (10) arranged below the suspension plane (Z).

15. The airbag module according to claim 12, wherein the ratio of the total weight of the portions of the inflator (10) above the suspension plane (Z) to the total weight of the portions of the inflator (10) below the suspension plane (Z) amounts to 1±0.25.

16. The airbag module according to claim 1, wherein the balancing weight (58) is free of connection to the external housing (12).

17. The airbag module according to claim 1, wherein the external housing (12) includes a diffuser (14) defining a top of the inflator (10) and a locking member (20) connected to the diffuser (14) and defining a bottom of the inflator (10), the balancing weight (58) being positioned within the locking member (20).

18. The airbag module according to claim 17, wherein the balancing weight (58) is positioned entirely within the locking member (20).

19. The airbag module according to claim 17, wherein the balancing weight (58) is free of connection to the locking member (20).

20. The inflator (10) according to claim 1, wherein the balancing weight (58) arranged inside the external housing (12) has a mass corresponding to about 25 to 53 % of the total weight of the inflator (10).

21. The inflator (10) according to claim 1, wherein the density of the inflator (10) amounts to about 3.6 to 4.1 $g/cm^3$.

22. The inflator (10) according to claim 1, wherein the ratio of the density of the inflator (10) to the releasable amount of gas of the inflator (10) amounts to about 2.4 to 4.6 $g*cm^{-3}*mol^{-1}$.

23. The inflator (10) according to claim 1, wherein the ratio of the mass of the balancing weight (58) to the releasable amount of gas of the inflator (10) amounts to about 54 to 180 g/mol.

24. The inflator (10) according to claim 1, wherein the ratio of the mass of all parts of the inflator (10) disposed inside the external housing (12) to the mass of the balancing weight (58) amounts to about 0.7 to 1.7.

25. The airbag module according to claim 1, wherein the ratio of the total weight of the portions of the inflator (10) above the suspension plane (Z) to the total weight of the portions of the inflator (10) below the suspension plane (Z) amounts to 1±0.1.

* * * * *